No. 627,138. Patented June 20, 1899.
J. H. POTTENGER.
INSECT POWDER DISTRIBUTER.
(Application filed Aug. 22, 1898.)
(No Model.)
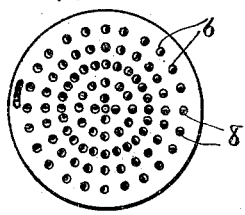
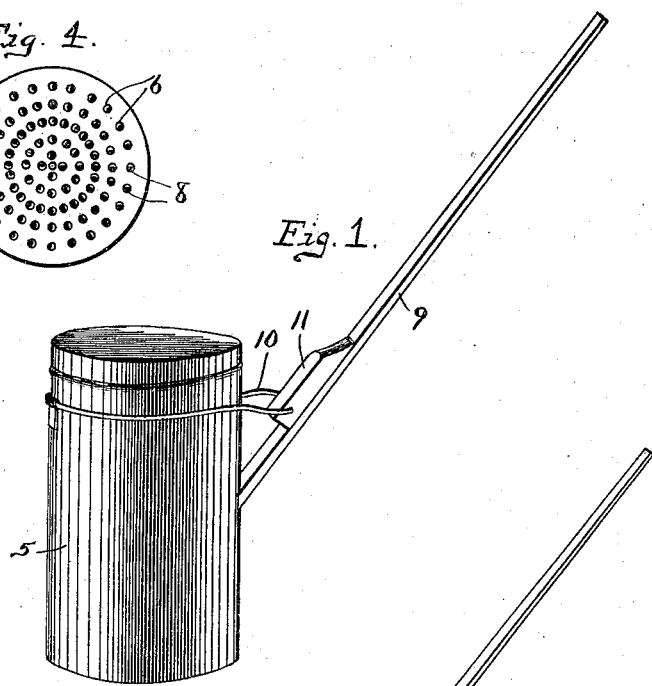
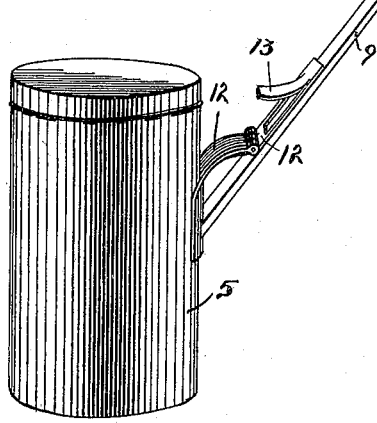
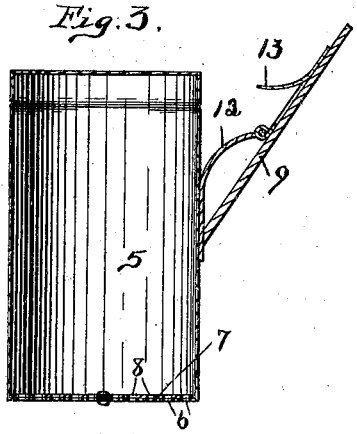
WITNESSES:
INVENTOR
James H. Pottenger
BY
Arthur M. Hood,
ATTORNEY.

UNITED STATES PATENT OFFICE.

JAMES H. POTTENGER, OF FRANKLIN, INDIANA, ASSIGNOR TO JAMES A. EVERITT, OF INDIANAPOLIS, INDIANA.

INSECT-POWDER DISTRIBUTER.

SPECIFICATION forming part of Letters Patent No. 627,138, dated June 20, 1899.

Application filed August 22, 1898. Serial No. 689,177. (No model.)

*To all whom it may concern:*

Be it known that I, JAMES H. POTTENGER, a citizen of the United States, residing at Franklin, in the county of Marion and State of Indiana, have invented a new and useful Insect-Powder Distributer, of which the following is a specification.

My invention relates to an improvement in insect-powder distributers.

The object of my invention is to produce a device by which all sorts of powdered insecticides may be easily and quickly distributed.

The accompanying drawings illustrate my invention.

Figure 1 is a perspective view of one form of my device. Fig. 2 is a similar view of a slightly-modified form. Fig. 3 is a central vertical section. Fig. 4 is a plan view of the under side of the reservoir.

In the drawings, 5 indicates a suitable reservoir for holding a quantity of powdered material, such as insect-powder, lime-dust, &c. The bottom of reservoir 5 is pierced by a series of perforations 6, and, if desired, in order that the size of the openings may be adjusted I pivot upon said bottom a plate 7, which is also provided with a series of perforations 8, which by turning the plate upon its pivot may be brought to register with the perforations 6. In order that the powder within the reservoir may be caused to pass through the perforations 6 and 8, I pivot the reservoir upon the lower end of a suitable handle 9 by any suitable means, such as a band 10, which encircles the reservoir. The band 10 at one point is bent outward away from the reservoir and is pivotally supported in a projection 11, carried by the handle, the arrangement being such that when the parts are at rest the reservoir is engaged by the lower end of the handle, but at the same time is free to be swung about the pivotal point of the band 10 and the upper end of the reservoir brought into engagement with the projection 11.

It will be readily understood that any desired form of pivotal attachment may be substituted for the band 10 without departing from my invention. For instance, in the form shown in Fig. 2 the reservoir is supported by means of a hinge 12, one leaf of which is secured to the reservoir and the other to the handle. If desired, a finger 13 may be secured to the handle in position to form a stop, against which the upper end of the reservoir may be brought as it swings about the pivot of the hinge.

In operation the reservoir is filled or partially filled with the desired powder, and the plate 7 is adjusted so that the effective perforations will be of the desired size. The operator then grasps the free end of the handle 9 and by a quick movement of the hand about the wrist-joint swings the lower end of the handle upward. This movement of the handle causes the reservoir to swing upward about its pivot until its upper end is brought suddenly into engagement with the handle and then to drop back until it is again arrested by coming into contact with the lower projecting end of the handle. It will be noticed that for each movement of the handle the reservoir is given two sharp taps or jolts, one by coming into contact with the projection 11 or finger 13 and the other by falling back against the lower end of the handle, and that the latter of these sharp taps will cause a flow of a small quantity of the powder through the perforations 6 and 8. At the same time the continual sharp jolting keeps the powder within the reservoir light and free, so that it cannot become packed.

The device just described is extremely efficient, and it has been found by actual practice to enable an operator to go thoroughly over a large area of plants in a very short time.

I claim as my invention—

1. In a device of the class described, a reservoir, suitable means through which the contents may be discharged therefrom, a suitable handle, a pivotal connection between said reservoir and handle, and means carried by the handle for engaging the reservoir when it is swung about its pivot.

2. In a device of the class described, a reservoir, suitable means through which the contents may be discharged therefrom, a suitable handle, a pivotal connection between said reservoir and handle whereby the reservoir may be swung about an axis at right angles to the direction of discharge, and means carried by the handle for engaging the reservoir when it is swung about its pivot.

3. In a device of the class described, a reservoir, suitable means through which the contents may be discharged therefrom, a suitable handle, a pivotal connection between said reservoir and handle, and means for limiting the upward swing of the reservoir, so that it may not pass beyond a discharging position.

4. In a device of the class described, a reservoir, suitable means through which the contents may be discharged therefrom, a suitable handle, a pivotal connection between said reservoir and handle, and means for limiting the movement of the reservoir in both directions, so that it may not pass beyond a discharging position.

5. In a device of the class described, a reservoir, suitable means through which the contents may be discharged therefrom, a suitable handle, a hinge connection between the reservoir and handle, and a finger 13 carried by the handle, in position to prevent the upward swing of the reservoir beyond a discharging position, substantially as described.

JAMES H. POTTENGER.

Witnesses:
ARTHUR M. HOOD,
JAMES A. EVERITT.